United States Patent
Haruna et al.

(10) Patent No.: US 9,588,286 B2
(45) Date of Patent: Mar. 7, 2017

(54) OPTICAL FIBER

(71) Applicant: Sumitomo Electric Industries, Ltd., Osaka (JP)

(72) Inventors: Tetsuya Haruna, Yokohama (JP); Masaaki Hirano, Yokohama (JP); Yoshiaki Tamura, Yokohama (JP); Nobuhiro Hikichi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/897,192

(22) PCT Filed: Jun. 6, 2014

(86) PCT No.: PCT/JP2014/065112
§ 371 (c)(1),
(2) Date: Dec. 9, 2015

(87) PCT Pub. No.: WO2014/199922
PCT Pub. Date: Dec. 18, 2014

(65) Prior Publication Data
US 2016/0131832 A1    May 12, 2016

(30) Foreign Application Priority Data

Jun. 10, 2013    (JP) .................. 2013-121562

(51) Int. Cl.
*G02B 6/036*    (2006.01)
*G02B 6/028*    (2006.01)

(52) U.S. Cl.
CPC ....... *G02B 6/03644* (2013.01); *G02B 6/0283* (2013.01); *G02B 6/0286* (2013.01)

(58) Field of Classification Search
None
See application file for complete search history.

(56) References Cited

U.S. PATENT DOCUMENTS

| 4,691,991 A | 9/1987 | Unger |
| 6,343,175 B1 | 1/2002 | Sasaoka |

(Continued)

FOREIGN PATENT DOCUMENTS

| EP | 0181595 A2 | 5/1986 |
| EP | 1122562 A1 | 8/2001 |

(Continued)

OTHER PUBLICATIONS

Extended European Search Report in European Patent Application No. 14811519.9, dated Jun. 13, 2016.

(Continued)

*Primary Examiner* — Tina Wong
(74) *Attorney, Agent, or Firm* — Venable LLP; Michael A. Sartori

(57) ABSTRACT

The optical fiber includes a core, the first cladding, and second cladding. The core is made of silica based glass containing Cl. The first cladding and the second cladding are made of silica based glass containing fluorine. The refractive index of the first cladding is lower than that of the core. The refractive index of the second cladding is lower than that of the core and higher than that of the first cladding. The second cladding is divided into an outer region having a uniform refractive index and an inner region having a refractive index higher than that of the outer region. The difference ΔP between the maximum refractive index of the inner region and the refractive index of the outer region is 0.02% to 0.10% in terms of relative refractive index with respect to pure silica based glass. The radial thickness R of the inner region is 10 μm to 25 μm.

2 Claims, 9 Drawing Sheets

(56) References Cited

U.S. PATENT DOCUMENTS

| | | | |
|---|---|---|---|
| 7,088,900 B1* | 8/2006 | Mishra | C03C 3/06 385/123 |
| 7,536,067 B2* | 5/2009 | Handelman | G02B 6/4246 385/16 |
| 7,593,612 B2* | 9/2009 | Shimotakahara | G02B 6/03655 385/128 |
| 7,844,155 B2* | 11/2010 | Bickham | G02B 6/02333 385/126 |
| 9,097,834 B2* | 8/2015 | Hirano | C03B 37/01211 |
| 2005/0063663 A1* | 3/2005 | Anderson | C03B 37/01211 385/142 |
| 2006/0233503 A1 | 10/2006 | Kumano | |
| 2012/0324960 A1* | 12/2012 | Sattmann | C03B 37/01211 65/397 |
| 2013/0034654 A1* | 2/2013 | Haruna | C03B 37/01211 427/163.2 |
| 2015/0370008 A1* | 12/2015 | Tamura | C03B 37/01807 385/123 |
| 2016/0109651 A1* | 4/2016 | Borel | C03B 37/01446 385/128 |
| 2016/0170137 A1* | 6/2016 | Borel | C03B 37/01446 385/127 |
| 2016/0214886 A1* | 7/2016 | Hirano | G02B 6/02 |

FOREIGN PATENT DOCUMENTS

| | | |
|---|---|---|
| EP | 1241494 A2 | 9/2002 |
| EP | 1241494 A3 | 12/2004 |
| JP | 60-21009 A | 2/1985 |
| JP | 09-127354 A | 5/1997 |
| JP | 11-52161 A | 2/1999 |
| JP | 2003-075674 A | 3/2003 |
| JP | 2003-146680 A | 5/2003 |
| JP | 2008-058663 A | 3/2008 |
| WO | WO-00/17685 A1 | 3/2000 |
| WO | WO-00/42458 A1 | 7/2000 |
| WO | WO-03/086997 A1 | 10/2003 |

OTHER PUBLICATIONS

International Search Report in International Patent Application No. PCT/JP2014/065112, dated Sep. 9, 2014.

* cited by examiner

FIG. 8
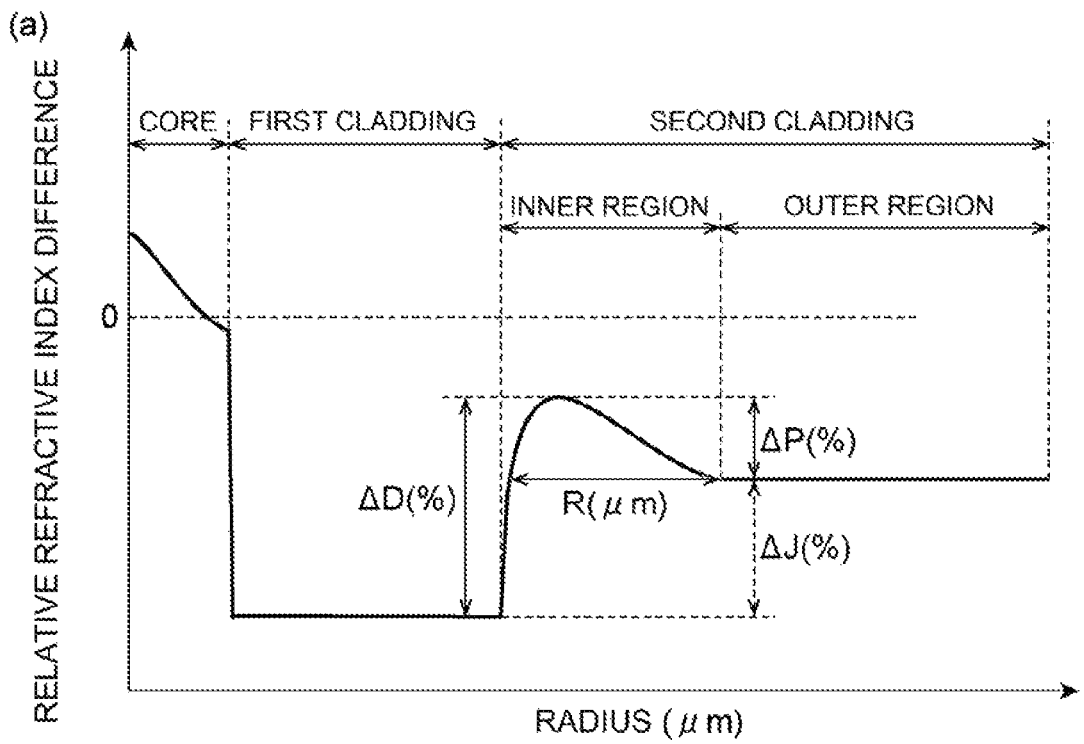
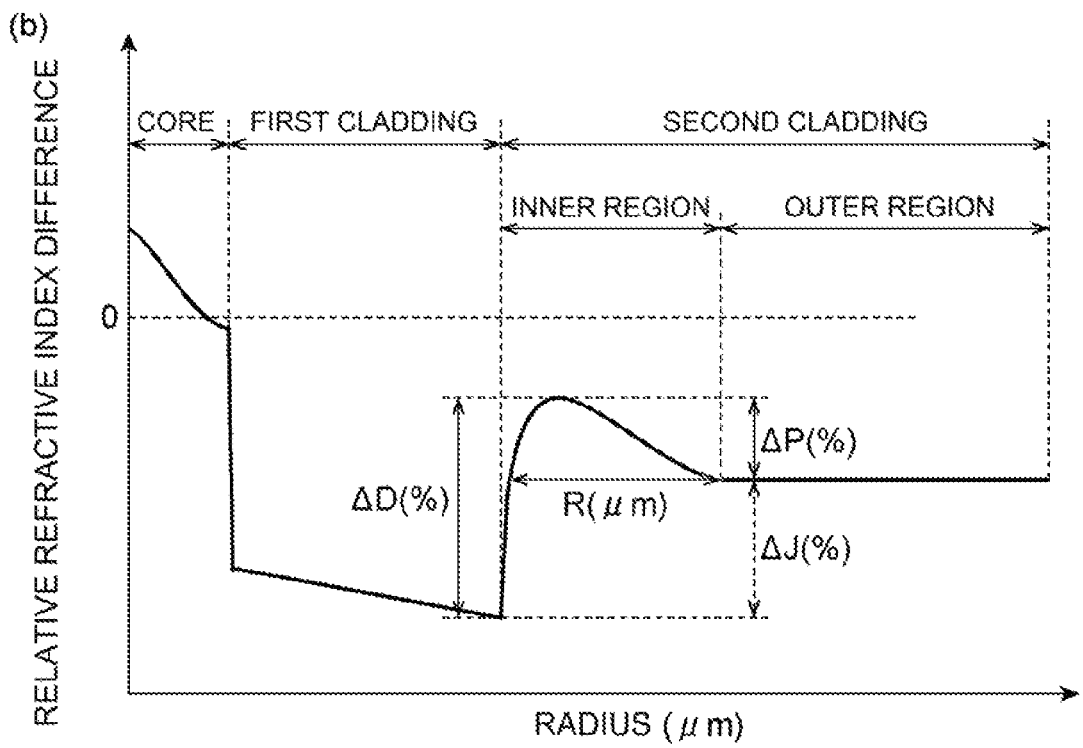

FIG. 9
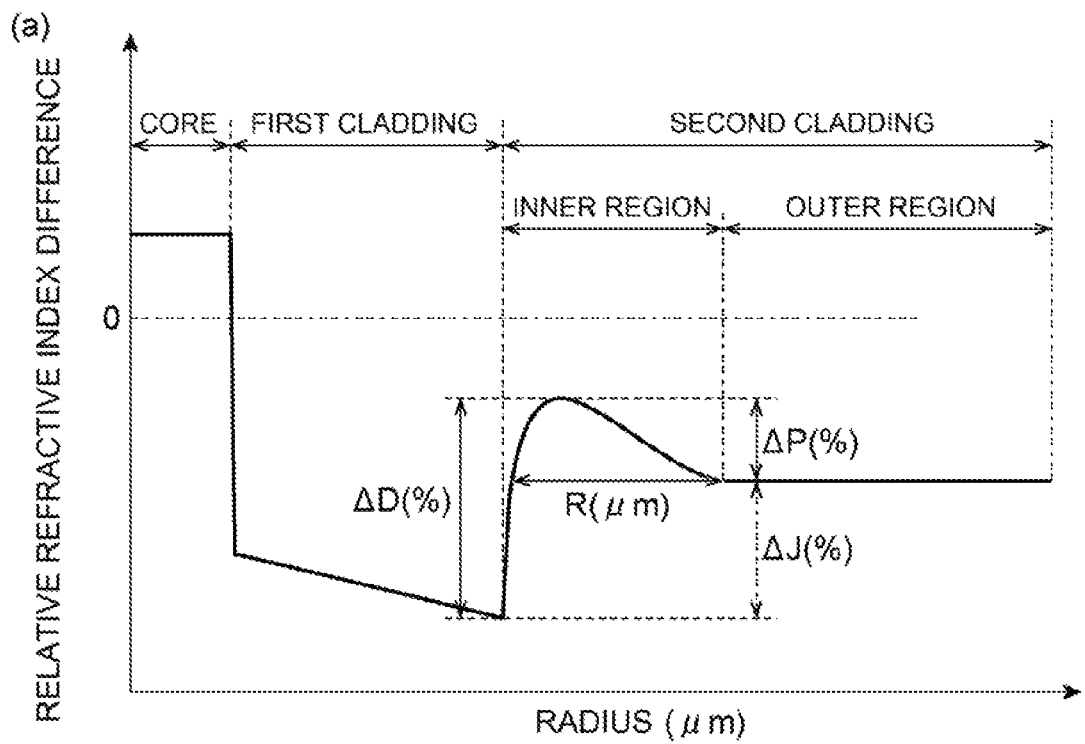
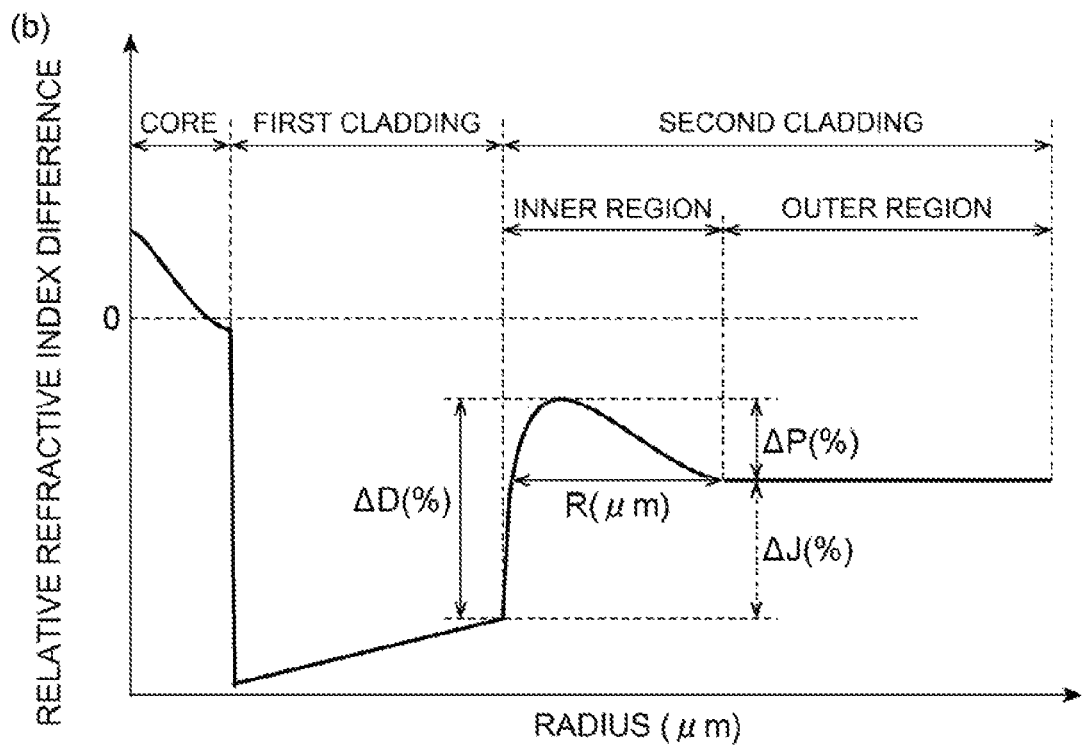

OPTICAL FIBER

TECHNICAL FIELD

The present invention relates to an optical fiber.

BACKGROUND ART

Known examples of low-loss optical fibers include an optical fiber that includes a core, which is made of silica based glass containing Cl, and a first cladding, which is made of silica based glass containing fluorine so as to have a refractive index lower than the refractive index of the core. Here, the concentration of Cl in the core is about 10 atomic ppm or higher and 20,000 atomic ppm or lower. An example of a more detailed refractive index structure of such optical fibers is known as a depressed cladding structure. In the depressed cladding structure, a cladding includes a first cladding and a second cladding. The first cladding, which surrounds the core, has a refractive index lower than the refractive index of the core. The second cladding, which surrounds the first cladding, has a refractive index lower than the refractive index of the core and higher than the refractive index of the first cladding.

An optical fiber preform for making a fiber having such a depressed cladding structure can be made as described below. A rod made of silica based glass containing Cl, which is to become the core of the optical fiber, is made; and a pipe made of silica based glass containing fluorine, which is to become the first cladding of the optical fiber, is made. The rod is inserted into the pipe, and a glass intermediate is made by heating and integrating the pipe and the rod. A glass layer to become the second cladding of the optical fiber is formed around the glass intermediate, and thereby an optical fiber preform is made. An optical fiber having the depressed cladding structure can be made by drawing the optical fiber preform.

A rod-in-collapse process is an example of a method for forming a glass layer, which is to become a second cladding of an optical fiber, around a glass intermediate. In the rod-in-collapse process, a pipe made of silica based glass containing fluorine, which is to become the second cladding, is made; a glass intermediate is inserted into the pipe; and an optical fiber preform is made by heating and integrating the pipe and the glass intermediate.

VAD and OVD are other examples of a process for forming a glass layer to become a second cladding of an optical fiber around a glass intermediate. In these cases, $SiO_2$ soot is deposited on an outer peripheral surface of the glass intermediate by using VAD or OVD, the $SiO_2$ soot is sintered into transparent glass in a fluorine-containing atmosphere, and thereby an optical fiber preform is made.

SUMMARY OF INVENTION

Technical Problem

An object of the present invention is to provide an optical fiber that has a depressed cladding structure including a core, which is made of silica based glass containing Cl, and a first cladding and a second cladding, which are made of silica based glass containing fluorine, and that can perform single-mode propagation at a signal light wavelength.

Solution to Problem

An optical fiber according to the present invention includes (1) a core made of silica based glass containing Cl; (2) a first cladding that surrounds the core, that has a refractive index lower than a refractive index of the core, and that is made of silica based glass containing fluorine; and (3) a second cladding that surrounds the first cladding, that has a refractive index lower than the refractive index of the core and higher than the refractive index of the first cladding, and that is made of silica based glass containing fluorine. The second cladding is divided into an outer region that has a substantially uniform refractive index and an inner region that is located inside of the outer region and that has a refractive index higher than the refractive index of the outer region. A difference between a maximum refractive index of the inner region and the refractive index of the outer region is 0.02% or greater and 0.10% or smaller in terms of relative refractive index, and a radial thickness of the inner region is 10 μm or greater and 25 μm or smaller.

Here, the term "relative refractive index" refers to a relative value of the refractive index of a region of interest with respect to the refractive index of pure silica glass (a value obtained by dividing the refractive index of a region of interest by the refractive index of pure silica glass). In the present description, unless otherwise noted, the magnitude of a refractive index is represented by using "relative refractive index". The term "substantially uniform" refers to a condition such that the variation in the refractive index of the outer region of the cladding is ±0.01% or smaller with respect to the average value in terms of the relative refractive index.

Advantageous Effects of Invention

The optical fiber according to the present invention has a depressed cladding structure including a core, which is made of silica based glass containing Cl, and a first cladding and a second cladding made of silica based glass containing fluorine; and the optical fiber can perform single-mode propagation and can have a low transmission loss at a signal light wavelength.

BRIEF DESCRIPTION OF DRAWINGS

FIG. 8 is a conceptual diagram illustrating an example of the structures of a core and claddings.

FIG. 9 is a conceptual diagram illustrating an example of the structures of a core and claddings.

DESCRIPTION OF EMBODIMENTS

When using a rod-in-collapse process to form a glass layer, which is to become a second cladding of an optical fiber, around a glass intermediate, it is necessary to make a pipe made of silica based glass containing fluorine. Accordingly, the number of process steps is increased and the production cost is increased as a result, and therefore it is impractical to use the rod-in-collapse process. In contrast, a method of using VAD or OVD is more practical than the rod-in-collapse process, because it can be performed at a lower production cost. However, the inventors found that this method has the following problem.

Namely, an inner region of the second cladding, which is near the first cladding, may not be sufficiently doped with fluorine as compared with an outer region, which is disposed outside of the inner region; and the inner region may have a refractive index higher than the refractive index of the outer region. If the refractive index difference between the inner region and the outer region of the second cladding is too large or the radial thickness of the inner region, which has a higher refractive index, is too large, higher order modes may remain in the optical fiber. As a result, there is a possibility that the optical fiber may become unable to perform single-mode propagation at a signal light wavelength or the transmission loss of the optical fiber may increase.

Figure 1:
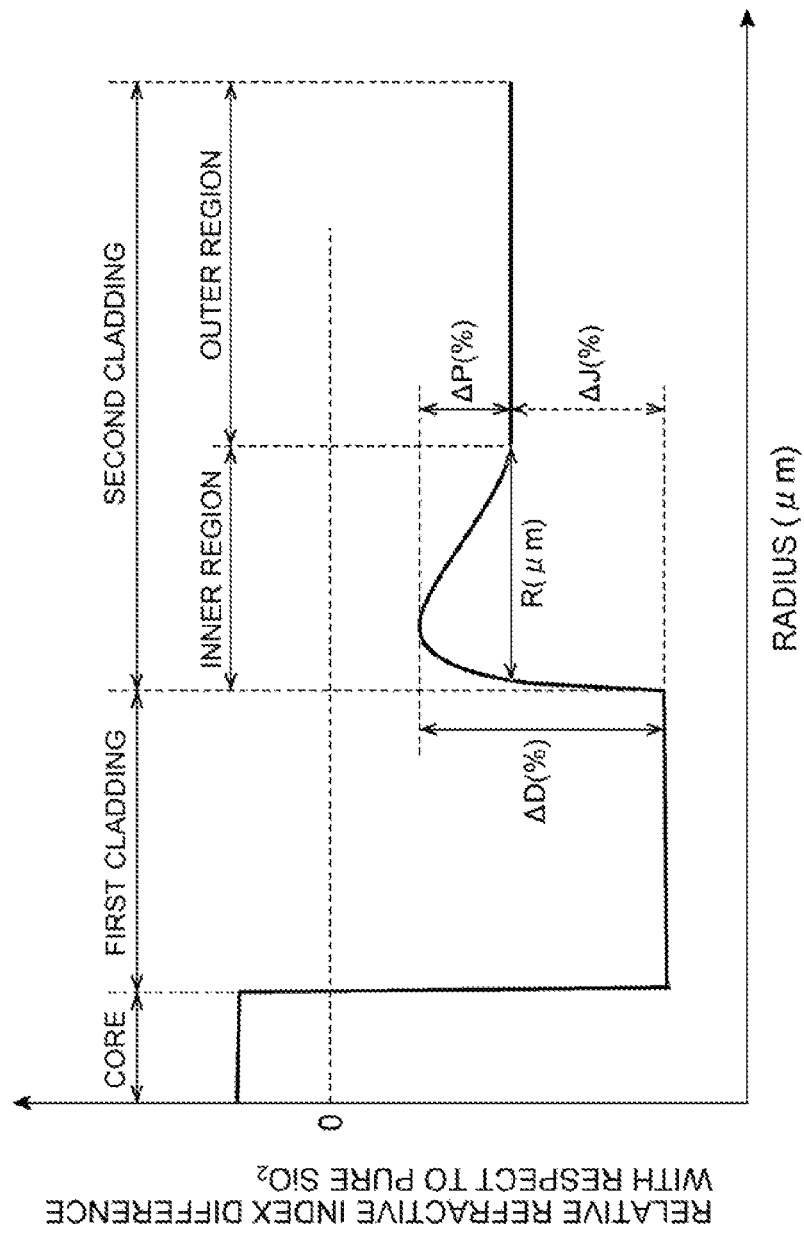
FIG. 1 is a conceptual diagram illustrating a refractive index profile of an optical fiber according to an embodiment of the present invention.

Hereinafter, an embodiment of the present invention will be described in detail with reference to the drawings. FIG. 1 is a conceptual diagram illustrating a refractive index profile of an optical fiber according to the embodiment of the present invention. The optical fiber according to the present embodiment includes a core, a first cladding that surrounds the core, and a second cladding that surrounds the first cladding. The core is made of silica based glass containing Cl. The first cladding and the second cladding are each made of silica based glass containing fluorine. The refractive index of the first cladding is lower than the refractive index of the core. The refractive index of the second cladding is lower than the refractive index of the core and higher than the refractive index of the first cladding. In other words, the optical fiber according to the present embodiment has a refractive index profile of a depressed cladding structure.

As illustrated in FIG. 1, the second cladding of the optical fiber according to the present embodiment is divided into an outer region having a uniform refractive index and an inner region that is located inside of the outer region and that has a refractive index higher than the refractive index of the outer region. The difference $\Delta P$ between the maximum refractive index of the inner region and the refractive index of the outer region is 0.10% or smaller in terms of relative refractive index. The radial thickness R of the inner region is 25 μm or smaller. In this case, the difference $\Delta D$ between the maximum refractive index of the inner region and the refractive index of the first cladding is 0.05% or greater and 0.15% or smaller in terms of relative refractive index.

For example, in the optical fiber according to the present embodiment, the ratio of the outside diameter of the first cladding to the outside diameter of the core is in the range of 3 or greater and 5 or smaller. The ratio of the outside diameter of the optical fiber to the outside diameter of the first cladding is in the range of 2 or greater and 5 or smaller. The relative refractive index difference between the core and the first cladding is in the range of 0.25% to 0.50%.

Hereinafter, regarding such an optical fiber, the relationships between $\Delta P$, R, $\Delta D$, the cable cut-off wavelength, and the transmission loss will be described.

Figure 2:
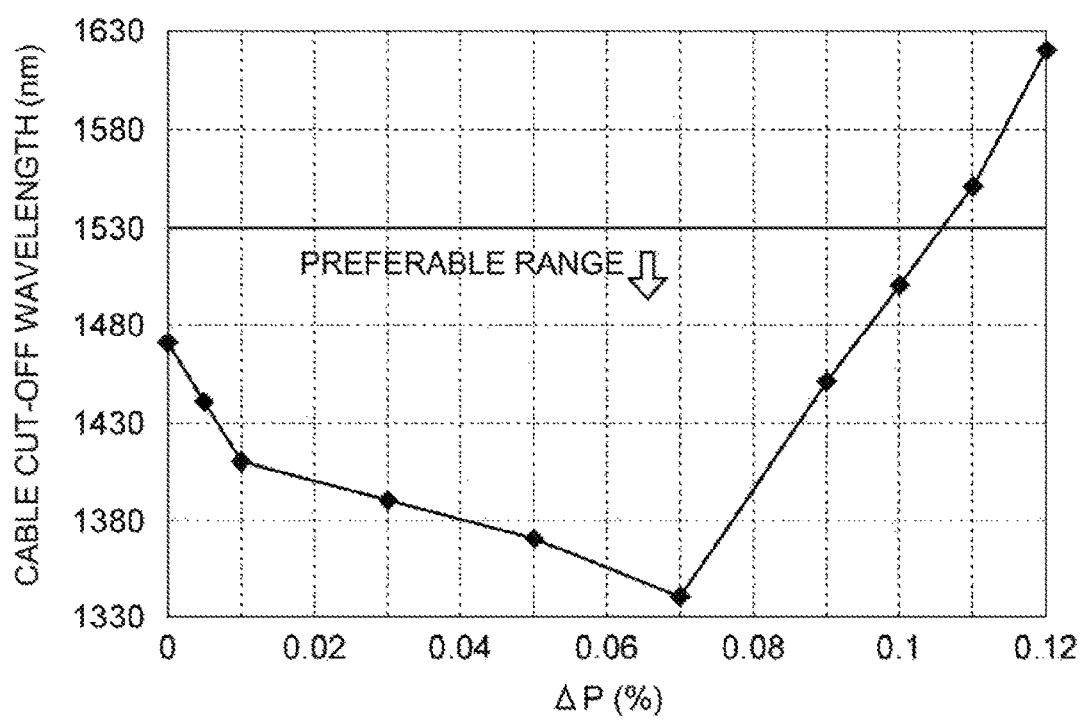
FIG. 2 is a graph representing the relationship between the cable cut-off wavelength and the relative refractive index difference ΔP of the optical fiber illustrated in FIG. 1.

FIG. 2 is a graph representing the relationship between the cable cut-off wavelength and the relative refractive index difference $\Delta P$ of the optical fiber according to the present embodiment. In this case, the difference $\Delta J$ between the refractive index of the outer region of the second cladding and the refractive index of the first cladding positioned at the interface between the second cladding and the first cladding is 0.05% in terms of relative refractive index, and the radial thickness R of the inner region is 15 μm. When the $\Delta P$ is 0.07% or smaller, the cable cut-off wavelength decreases as $\Delta P$ increases. When the $\Delta P$ becomes 0.11% or greater, the cable cut-off wavelength increases sharply. When $\Delta P=0.11\%$, the cable cut-off wavelength is 1550 nm, and the optical fiber cannot perform single-mode transmission in the transmission wavelength band (from 1530 to 1575 nm). Thus, it can be seen that, preferably, $\Delta P$ is 0.10% or smaller, that is, $\Delta D$ is 0.15% or smaller.

Figure 3:
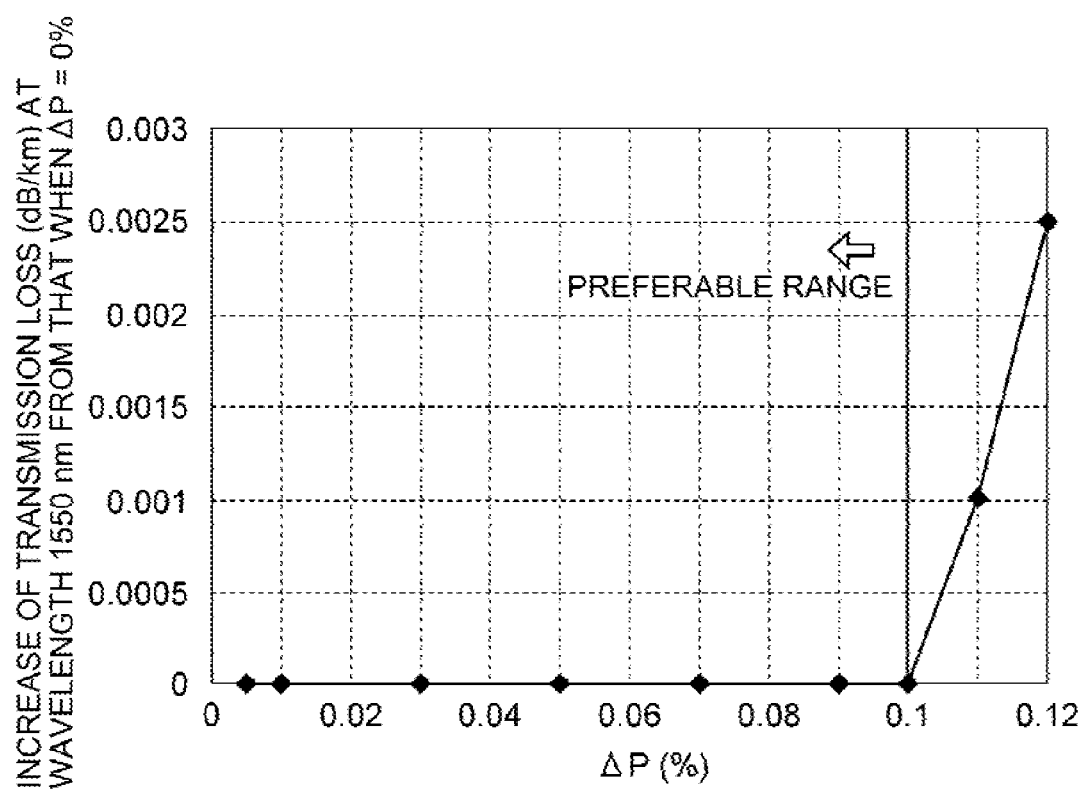
FIG. 3 is a graph representing the relationship between the transmission loss at a wavelength of 1550 nm and the relative refractive index difference ΔP of the optical fiber illustrated in FIG. 1.

FIG. 3 is a graph representing the relationship between the transmission loss at a wavelength of 1550 nm and the relative refractive index difference $\Delta P$ of the optical fiber according to the present embodiment. The vertical axis represents an increase of transmission loss from the transmission loss when $\Delta P=0\%$. In this case, the difference $\Delta J$ between the refractive index of the outer region of the second cladding and the refractive index of the first cladding positioned at the interface between the second cladding and the first cladding is 0.05%, and the radial thickness R of the inner region is 15 μm. It can be seen that an increase of transmission loss does not occur if the difference between the maximum refractive index of the inner region and the refractive index of the outer region $\Delta P$ is 0.10% or smaller, that is, $\Delta D$ is 0.15% or smaller.

Figure 4:
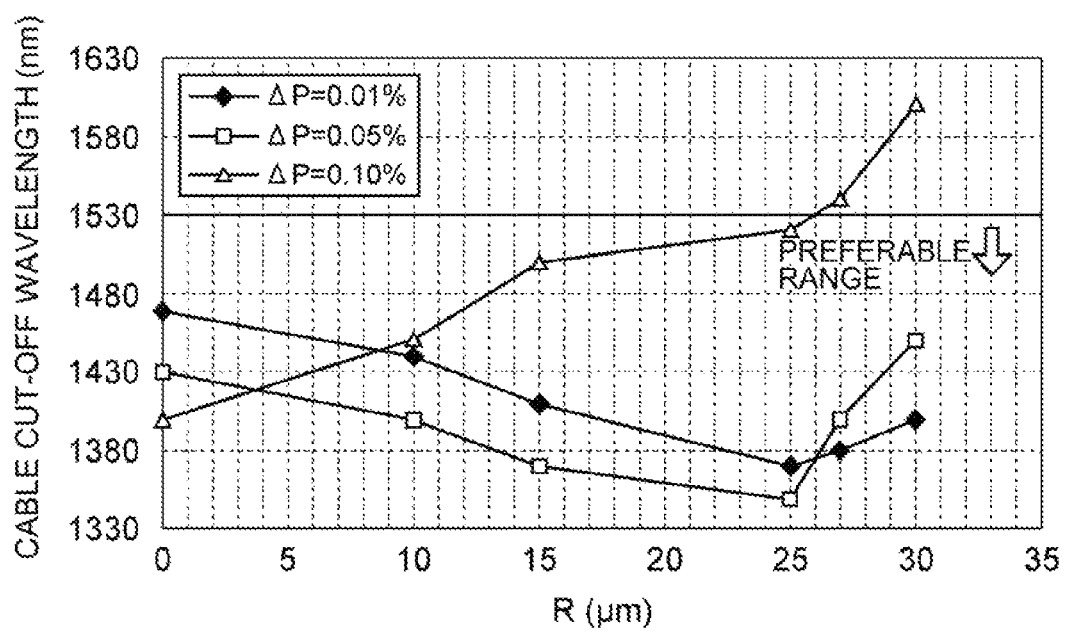
FIG. 4 is a graph representing the relationship between the cable cut-off wavelength and the radial thickness R of an inner region of a second cladding of the optical fiber illustrated in FIG. 1.

FIG. 4 is a graph representing the relationship between the cable cut-off wavelength and the radial thickness R of the inner region of the optical fiber according to the present embodiment. In this case, the difference $\Delta J$ between the refractive index of the outer region of the second cladding and the refractive index of the first cladding positioned at the interface between the second cladding and the first cladding is 0.05%. It can be seen that, if R=30 μm, the cable cut-off wavelength plotted on the vertical axis is 1550 nm or greater, and the optical fiber cannot perform single-mode transmission in the transmission wavelength band; and if R=25 μm or smaller, the cable cut-off wavelength is shorter than the transmission wavelength band, and the optical fiber can perform single-mode transmission in the transmission wavelength band.

Figure 5:
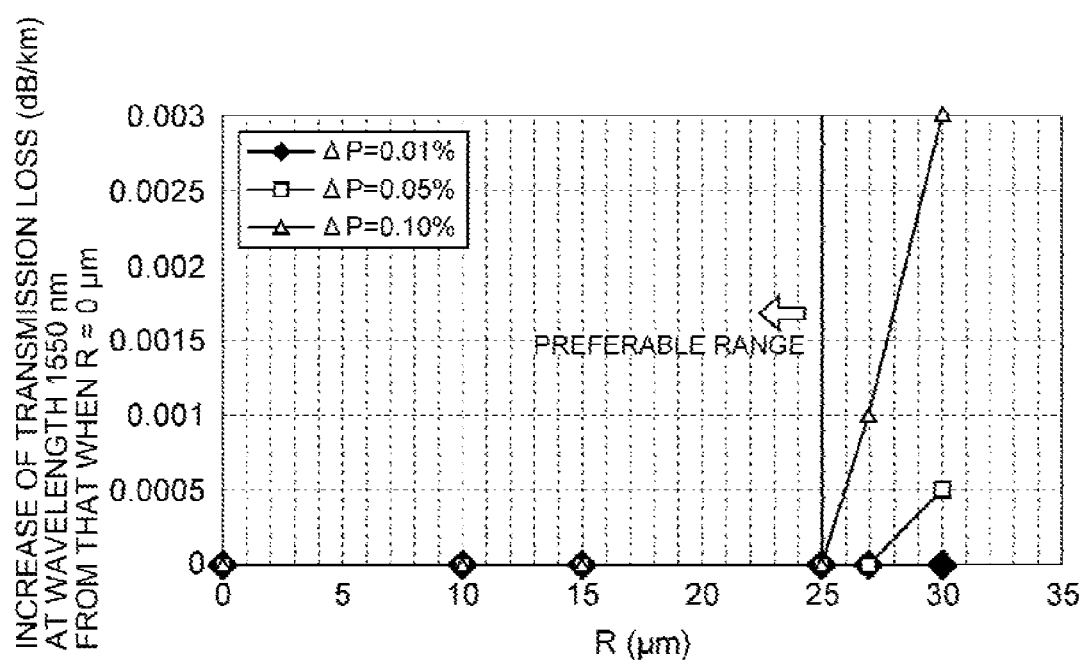
FIG. 5 is a graph representing the relationship between the transmission loss at a wavelength of 1550 nm and the radial thickness R of the inner region of the second cladding of the optical fiber illustrated in FIG. 1.
Figure 6:
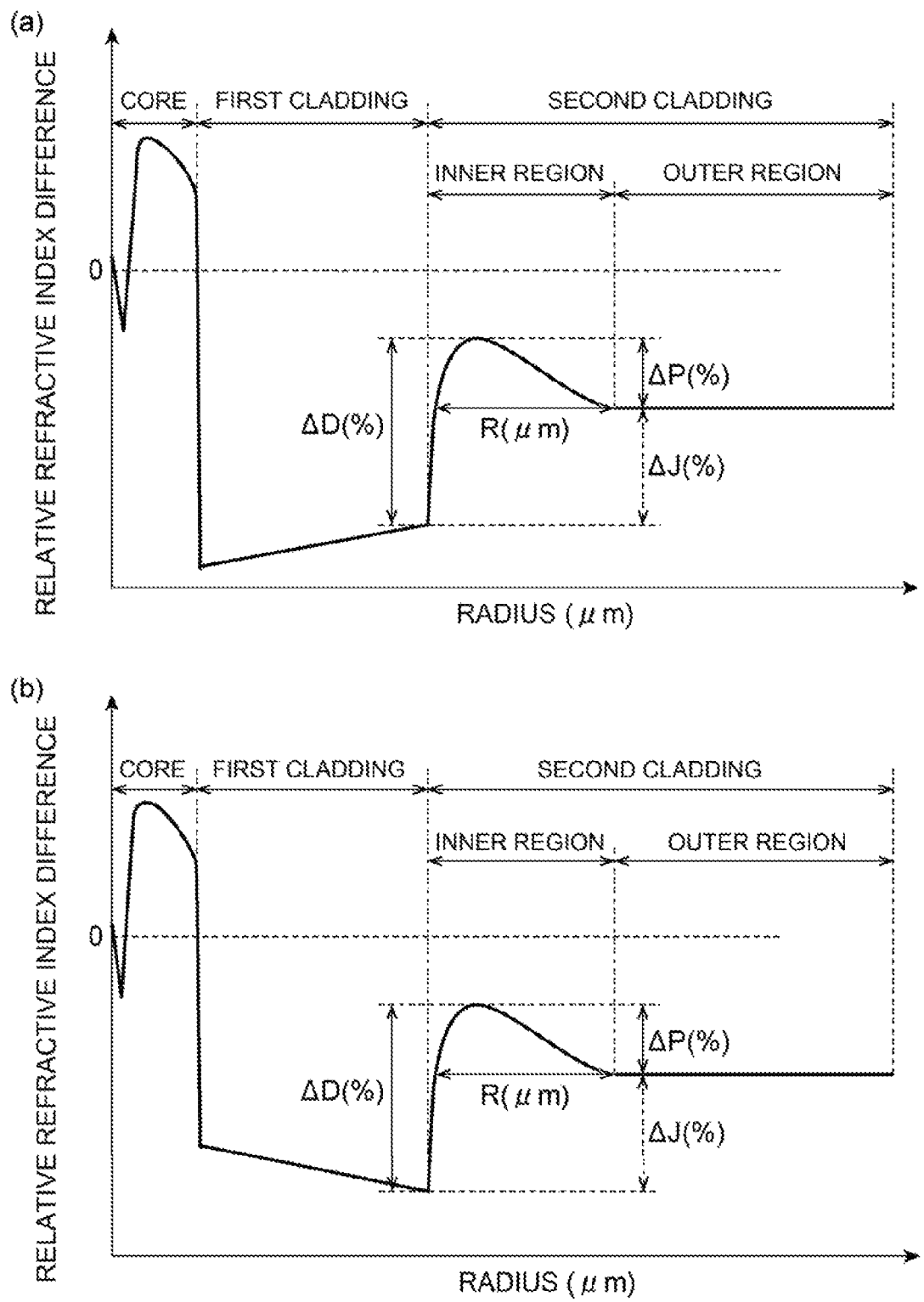
FIG. 6 is a conceptual diagram illustrating an example of the structures of a core and claddings.
Figure 7:
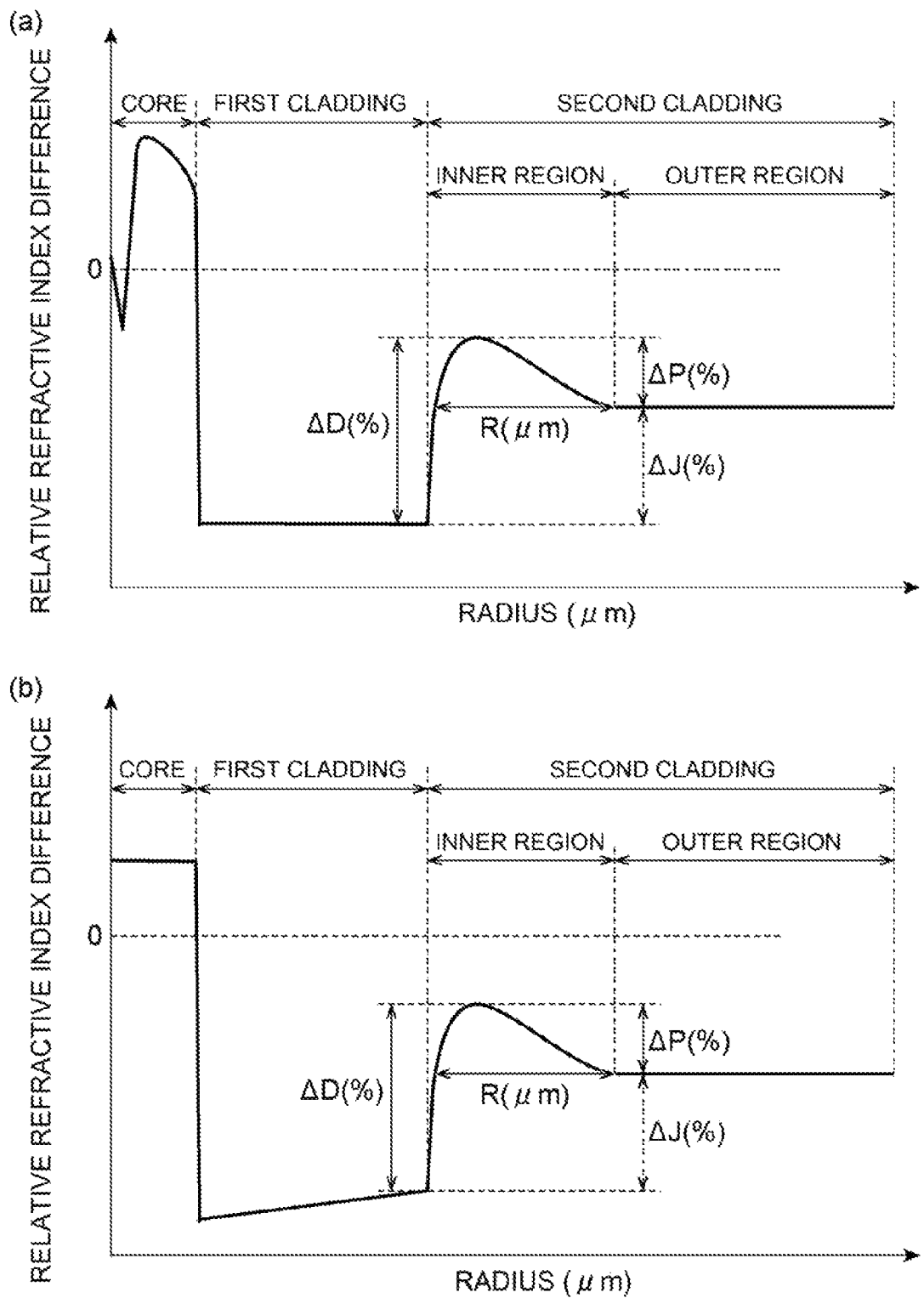
FIG. 7 is a conceptual diagram illustrating an example of the structures of a core and claddings.

FIG. 5 is a graph representing the relationship between the transmission loss at a wavelength of 1550 nm and the radial thickness R of the inner region of the optical fiber according to the present embodiment. The vertical axis represents an increase of transmission loss from the transmission loss when R=0 μm. The difference $\Delta J$ between the refractive index of the outer region of the second cladding and the refractive index of the first cladding positioned at the interface between the second cladding and the first cladding is 0.05%. The difference $\Delta P$ between the maximum refractive index of the inner region and the refractive index of the outer region is one of the following: 0.01%, 0.05%, and 0.10%. It can be seen that an increase of transmission loss does not occur if the radial thickness R of the inner region is 25 μm or smaller.

Preferably, the difference ΔP between the maximum refractive index of the inner region and the refractive index of the outer region is as close as possible to 0%. Preferably, the radial thickness R of the inner region is as close as possible to 0 μm. However, in the step of forming a second cladding when making an optical fiber preform, $SiO_2$ soot is deposited on a glass intermediate composed of a core and a first cladding, and the $SiO_2$ soot is sintered into transparent glass in a fluorine-containing atmosphere. In this step, it is difficult to uniformly dope the deposited $SiO_2$ soot with fluorine.

For example, in order to make the relative refractive index difference of the second cladding with respect to pure silica glass be −0.25% or higher, it is necessary to finely control the bulk density of the $SiO_2$ soot or to make the time for doping fluorine extremely long. It is practically difficult to adopt such processes, because such processes may increase the production cost and may considerably reduce the throughput. Accordingly, for manufacturing reasons, realistically, it is preferable that the difference ΔP between the maximum refractive index of the inner region and the refractive index of the outer region be 0.02% or greater, and that the radial thickness R of the inner region be 10 μm or greater.

The refractive index profile of the core and the cladding is not limited to the step-shaped profile shown in FIG. 1. For example, the refractive index profile may be any one of the structures shown in FIGS. 6 to 9.

The invention claimed is:
1. An optical fiber comprising:
   a core made of silica based glass containing Cl;
   a first cladding that surrounds the core, that has a refractive index lower than a refractive index of the core, and that is made of silica based glass containing fluorine; and
   a second cladding that surrounds the first cladding, that has a refractive index lower than the refractive index of the core and higher than the refractive index of the first cladding, and that is made of silica based glass containing fluorine,
   wherein the second cladding is divided into an outer region that has a substantially uniform refractive index and an inner region that is located inside of the outer region and that has a refractive index higher than the refractive index of the outer region,
   wherein a difference between a maximum refractive index of the inner region and the refractive index of the outer region is 0.02% or greater and 0.10% or smaller in terms of relative refractive index with respect to pure silica glass, and
   wherein a radial thickness of the inner region is 10 μm or greater and 25 μm or smaller.
2. The optical fiber according to claim 1, wherein the difference between the maximum refractive index of the inner region and the refractive index of the first cladding is 0.05% or greater and 0.15% or smaller in terms of relative refractive index with respect to pure silica glass.

* * * * *